US006786649B2

(12) United States Patent
Sherrer

(10) Patent No.: US 6,786,649 B2
(45) Date of Patent: Sep. 7, 2004

(54) OPTICAL WAVEGUIDE FERRULE AND METHOD OF MAKING AN OPTICAL WAVEGUIDE FERRULE

(75) Inventor: David W. Sherrer, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 180 days.

(21) Appl. No.: 09/851,376

(22) Filed: May 9, 2001

(65) Prior Publication Data

US 2001/0055449 A1 Dec. 27, 2001

Related U.S. Application Data

(60) Provisional application No. 60/202,988, filed on May 9, 2000.

(51) Int. Cl.$^7$ .................................................. G02B 6/36
(52) U.S. Cl. .......................................... 385/84; 385/83
(58) Field of Search ............................... 385/84, 83, 66

(56) References Cited

U.S. PATENT DOCUMENTS

| 3,846,010 A | 11/1974 | Love et al. |
| 3,885,859 A | 5/1975 | Dalgleish et al. |
| 4,142,776 A | 3/1979 | Cherin et al. |
| 4,257,674 A | 3/1981 | Griffin et al. |
| 4,320,938 A | 3/1982 | Gunnersen et al. |
| 4,593,972 A | 6/1986 | Gibson |
| 4,712,864 A | 12/1987 | Ellis et al. |
| 4,810,053 A * | 3/1989 | Woith .......................... 385/83 |
| 4,850,671 A | 7/1989 | Finzel |
| 4,889,405 A | 12/1989 | Walker et al. |
| 4,950,048 A | 8/1990 | Kakii et al. |
| 5,015,062 A | 5/1991 | Finzel |
| 5,367,594 A | 11/1994 | Essert et al. |
| 5,381,494 A | 1/1995 | O'Donnell et al. |
| 6,022,150 A * | 2/2000 | Erdman et al. ............... 385/81 |
| 6,246,812 B1 | 6/2001 | Liu et al. |
| 6,364,539 B1 * | 4/2002 | Shahid ......................... 385/83 |

* cited by examiner

*Primary Examiner*—C Prasad
(74) *Attorney, Agent, or Firm*—Jonathan D. Baskin

(57) ABSTRACT

A waveguide carrier is located within a carrier tube, and an optical waveguide extends lengthwise in a longitudinal direction within the waveguide carrier. The waveguide carrier is made up of a first carrier body having a first principal surface and a second carrier body having a second principal surface which confronts the first principal surface. The first principal surface has a first groove which extends lengthwise in the longitudinal direction, and the second principal surface has a second groove which extends lengthwise in the longitudinal direction. The first and second grooves are aligned with one another to define an elongate cavity which extends lengthwise in the longitudinal direction, and the optical waveguide is contained within the elongate cavity. The first and second carrier bodies may be fabricated by etching of one or more surfaces of a silicon wafer.

39 Claims, 10 Drawing Sheets

OPTICAL WAVEGUIDE FERRULE AND METHOD OF MAKING AN OPTICAL WAVEGUIDE FERRULE

CROSS-REFERENCE TO RELATED APPLICATIONS

Priority is claimed to U.S. Provisional Application Serial No. 60/202,988, filed May 9, 2000, the entirety of which is incorporated herein by reference.

BACKGROUND OF THE INVENTION

1. Field of the Invention

The present invention relates to optical waveguides, and more particularly, the present invention relates to ferrules for optical waveguides.

2. Description of the Related Art

The increasing demand for high-speed voice and data communications has led to an increased reliance on optical communications, particularly optical fiber communications. The use of optical signals as a vehicle to carry channeled information at high speeds is preferred in many instances to carrying channeled information at other electromagnetic wavelengths/frequencies in media such as microwave transmission lines, co-axial cable lines and twisted pair transmission lines. Advantages of optical media are, among others, high-channel (bandwidth), greater immunity to electromagnetic interference, and lower propagation loss. In fact, it is common for high-speed optical communication system to have signal rates in the range of approximately several Giga bits per second (Gbit/sec) to approximately several tens of Gbit/sec.

The optical fiber ferrule is a commonly utilized component in optical fiber connectors and other optical network devices, and FIG. 1 is a cross-sectional view of a conventional optical fiber ferrule. In such a component, a fiber carrier 101 made of glass extends longitudinally within a carrier tube 102 also made of glass. As shown, the fiber carrier 101 includes a precisely dimensioned through-hole 103 which contains an optical fiber 104. However, the conventional configuration of FIG. 1 suffers certain drawbacks. For example, the fiber 104 must be threaded into the glass carrier tube 102, which is a difficult and sometimes costly process. Also, the carrier tubes 102 are drawn from a heated preform which makes the fabrication thereof relatively expensive.

SUMMARY OF THE INVENTION

According to one aspect of the present invention, an optical waveguide ferrule includes a carrier tube, a waveguide carrier located within the carrier tube, and an optical waveguide extending lengthwise in a longitudinal direction within the waveguide carrier. The waveguide carrier is made up of a first carrier body having a first principal surface and a second carrier body having a second principal surface which confronts the first principal surface. The first principal surface has a first groove which extends lengthwise in the longitudinal direction, and the second principal surface has a second groove which extends lengthwise in the longitudinal direction. The first and second grooves are aligned with one another to define an elongate cavity which extends lengthwise in the longitudinal direction, and the optical waveguide is contained within the elongate cavity.

According to another aspect of the invention, an optical waveguide ferrule includes a carrier tube, a plurality of waveguide carriers located within the carrier tube, and a plurality of optical waveguides extending lengthwise in a longitudinal direction within the waveguide carrier. The waveguide carrier is made up of a first carrier body having a first principal surface and a second carrier body having a second principal surface which confronts the first principal surface. The first principal surface has a plurality of first grooves which extend lengthwise in the longitudinal direction, and the second principal surface has a plurality of second grooves which extend lengthwise in the longitudinal direction. The plurality of first grooves are aligned with the plurality of second grooves to define a plurality of elongate cavities which extend lengthwise in the longitudinal direction, and the plurality of optical waveguides are contained within the plurality of elongate cavities, respectively.

According to still another aspect of the present invention, a silicon wafer is etched to form a plurality of grooves which extend parallel to one another in a first surface of the silicon wafer. The silicon wafer further etched to form a plurality of trenches in a second surface of the silicon wafer which is opposite the first surface. In particular, the trenches are formed so as to extend parallel to one another between respectively adjacent pairs of the parallel grooves and in a same direction as the parallel grooves. The silicon wafer is separated into discrete chips at respective bottoms of the trenches such that the first surface of each of the discrete chips includes at least one of the grooves. An optical waveguide is placed in a groove of a first one of the discrete chips, and the first surface of a second one of the discrete chips is placed against the first surface of the first one of the discrete chips such that the groove of the first one of the discrete chips is aligned with a groove of the second one of the discrete chips. As such, the optical waveguide is enclosed between the respective grooves of the first and second discrete chips.

According to yet another aspect of the present invention, a silicon wafer is etched to form a plurality of grooves which extend parallel to one another in a first surface of the silicon wafer. The silicon wafer is further etched to form a plurality of trenches in the first surface of the silicon wafer. In particular, the trenches are formed so as to extend parallel to one another between respectively adjacent pairs of the parallel grooves and in a same direction as the parallel grooves. The silicon wafer is separated into discrete chips at respective bottoms of the trenches such that the first surface of each of the discrete chips includes at least one of the grooves. An optical waveguide is placed in a groove of a first one of the discrete chips, and the first surface of a second one of the discrete chips is placed against the first surface of the first one of the discrete chips such that the groove of the first one of the discrete chips is aligned with a groove of the second one of the discrete chips. As such, the optical waveguide is enclosed between the respective grooves of the first and second discrete chips.

BRIEF DESCRIPTION OF THE DRAWINGS

The invention is best understood from the following detailed description when read with the accompanying drawings. It is emphasized that the various features are not necessarily drawn to scale. In fact, the dimensions may be arbitrarily increased or decreased for clarity of discussion.

DETAILED DESCRIPTION OF THE PREFERRED EMBODIMENTS

Figure 1:
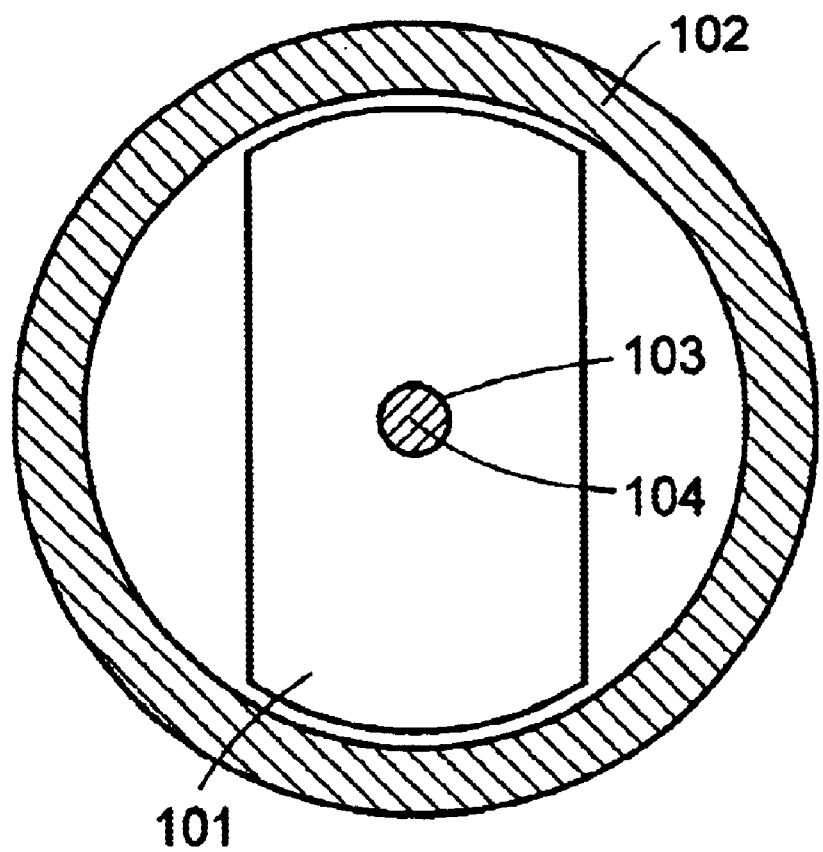
FIG. 1 is a cross-sectional view of a conventional optical fiber ferrule.

In the following detailed description, for purposes of explanation and not limitation, exemplary embodiments disclosing specific details are set forth in order to provide a thorough understanding of the present invention. However, it will be apparent to one having ordinary skill in the art having the benefit of the present disclosure, that the present invention may be practiced in other embodiments that depart from the specific details disclosed herein. Moreover, descriptions of well-known devices, methods and materials may be omitted so as to not obscure the description of the present invention.

Referring initially to the cross-sectional view of FIG. 2, an optical waveguide ferrule of an embodiment of the present invention with now be described in which a waveguide carrier 201 is longitudinally contained within a carrier tube 202. As shown, the waveguide carrier 201 is made up of two adjoined members which are herein referred to as "chips" 205 and 206.

In this embodiment, the chip 206 has an isosceles trapezoidal cross-section defined by opposite first and second parallel surfaces 207 and 208, and opposite inclined surfaces 209 and 210. The chip 205 is similarly configured. The surface 207 of the chip 206 further includes a groove 211 which is located along a length thereof. Likewise, the confronting surface of the chip 206 includes a similarly configured groove 212.

When assembled, the surface 207 of the chip 206 is adhered to the corresponding surface of the chip 205 to form the waveguide carrier 201 having a hexagonal cross-section. Preferably, the chips 205 and 206 are sized to avoid or minimize movement of the waveguide carrier within the carrier tube 202. As such, the corners 214 of the waveguide carrier 201 are in contact with or very close to the inside surface of the carrier tube 202.

Also, when assembled, the grooves 211 and 212 are aligned as shown to define an elongate cavity 213 for carrying an optical waveguide 204 (e.g., an optical fiber). As is the case generally with most ferrules, the cavity 213 is preferably located along a central axis of the carrier tube 202. Optionally, each of the grooves 211 and 212 has a V-shaped cross-section. As such, the cavity 213 has polygonal cross-section which closely conforms in size to the outer diameter of the optical waveguide 204.

To facilitate fabrication by wet anisotropic etching, the chips 205 and 206 are preferably, but not necessarily, made of a silicon or silicon containing material. The chips may instead be drawn from other materials, such as glass or ceramic. In these cases, the aforementioned grooves may be formed by a diamond cutting wheel.

The carrier tube 202 can be made of glass, metals, ceramics, and other materials. However, it is preferred that a coefficient of expansion of the carrier tube 202 matches that of the waveguide carrier 201. In the case of silicon chips 205 and 206, borosilicate glass, such as PYREX, trademark Corning, Inc., Corning, N.Y., is a preferred material for the carrier tube 202.

Figure 3:
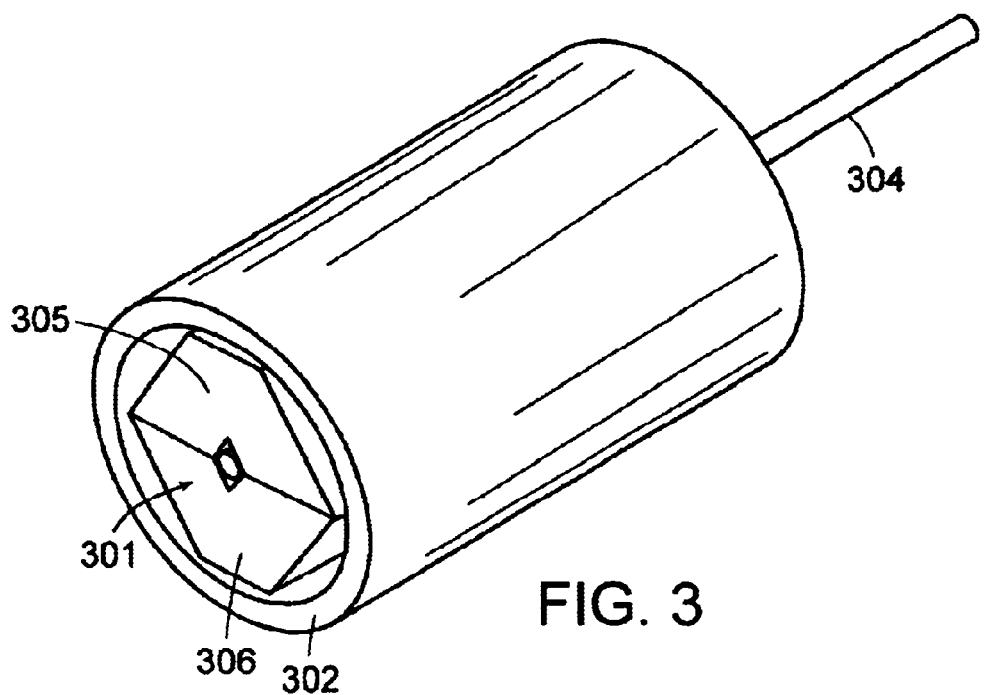
FIG. 3 is a perspective view of an optical waveguide ferrule according to the embodiment of the present invention.

FIG. 3 illustrates a perspective view of the optical waveguide ferrule of the embodiment of the present invention. As shown, the optical waveguide 304 extends along a central axis of the ferrule and is contained within the opposing grooves of the chips 305 and 306. The chips 305 and 306 form the waveguide carrier 301 which extends longitudinally within the carrier tube 302.

Figure 4:
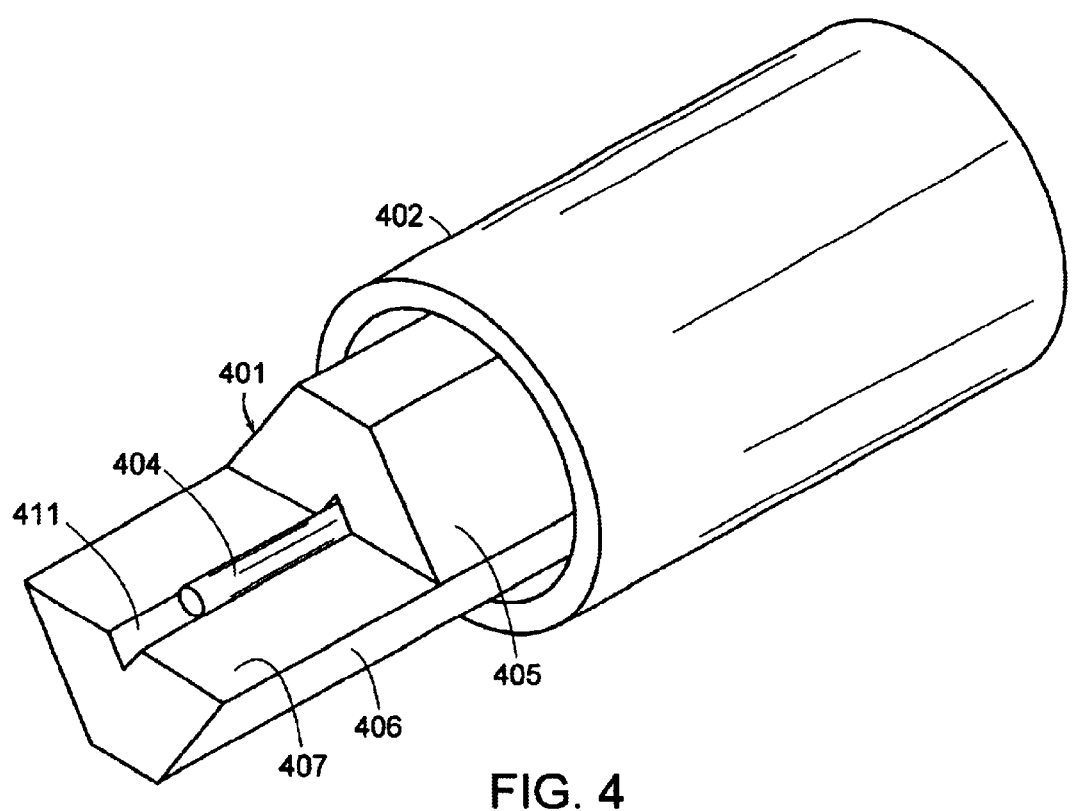
FIG. 4 is an exploded view of an optical waveguide ferrule according to the embodiment of the present invention.

FIG. 4 is an exploded view of the optical waveguide ferrule of the embodiment of the present invention. Again, the surface 407 of the chip 406 is adhered to the corresponding surface of the chip 405 to define the waveguide carrier 401 which extends longitudinally within the carrier tube 402. The optical waveguide 404 extends along a central axis of the ferrule and is contained within the opposing grooves 411 of the chips 405 and 406.

Figure 5A:
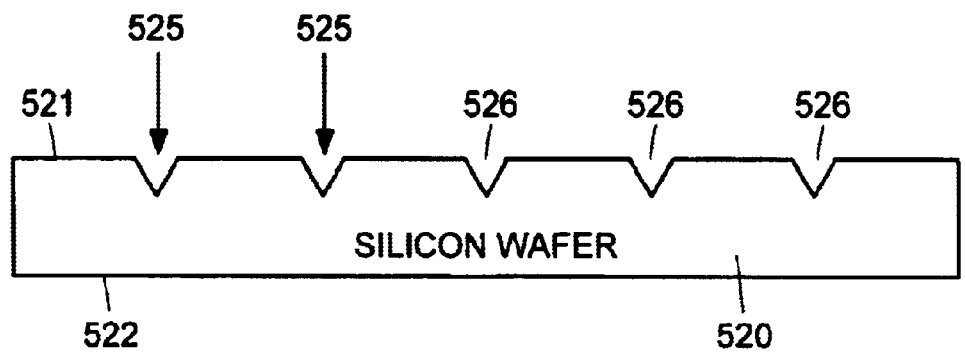
FIGS. 5(a) through 5(e) are cross-sectional views for describing a method of making the optical waveguide ferrule according to the embodiment of the present invention.

A method of manufacturing an optical waveguide ferrule according the an embodiment of the present invention will now be described with reference to the cross-sectional views of FIGS. 5(a) through 5(e). Initially, as shown in FIG. 5(a), a first surface 521 of a silicon wafer 520 is subjected to wet anisotropic etching 525 to form a plurality of elongate and generally V-shaped shallow grooves 526. Generally, the silicon wafer 521 should have an accurate (constant) thickness, preferably within ±2 microns. Then, referring to FIG. 5(b), a second surface 522 of the silicon wafer 520 is subjected to wet anisotropic etching 527 to form a plurality of elongate and generally V-shaped deep trenches 528. As shown, the deep trenches 528 in the surface 522 are aligned between the shallow grooves 526 in the surface 521.

Figure 5B:
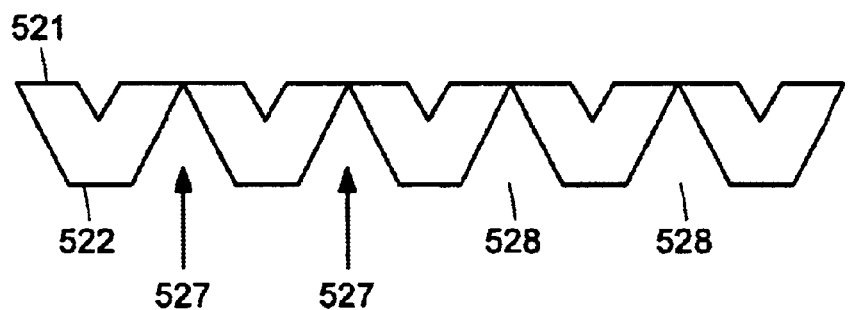
Figure 5C:
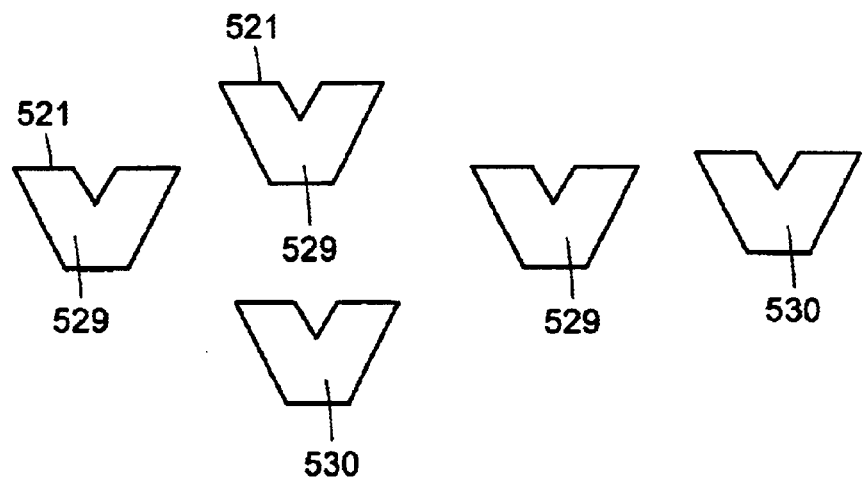

Turning to FIG. 5(c), the deep trenches 528 (FIG. 5(b)) are formed at a depth which extends completely or nearly completely to the first surface 521 so as to easily separate the wafer 520 into a plurality of similarly configured chips 529 and 530. These chips 529 and 530 respectively correspond to the chips 205 and 206 of FIG. 2 discussed above.

Figure 5D:
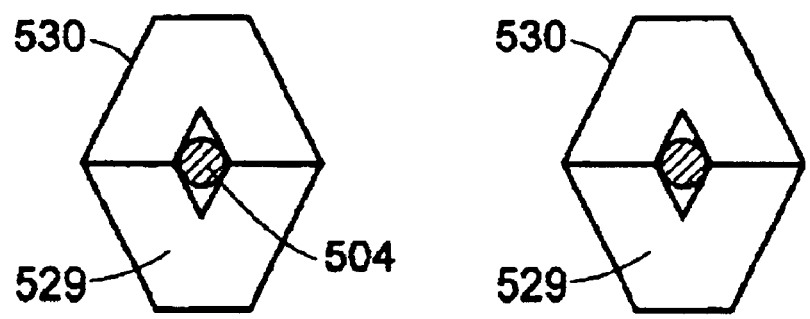

Then, as shown in FIG. 5(d), an optical waveguide 504 is positioned within the groove of the chip 529. The groove of the chip 530 is then aligned with groove of the chip 529 and the corresponding surfaces are attached together with an epoxy or other suitable adhesive. In this manner, the optical waveguide 504 is secured within the waveguide carrier 531, i.e., within the cavity defined by the opposing grooves of the chips 529 and 530. It is therefore not necessary to carry out the often difficult task of threading the optical waveguide 504 into a small hole.

Figure 5E:
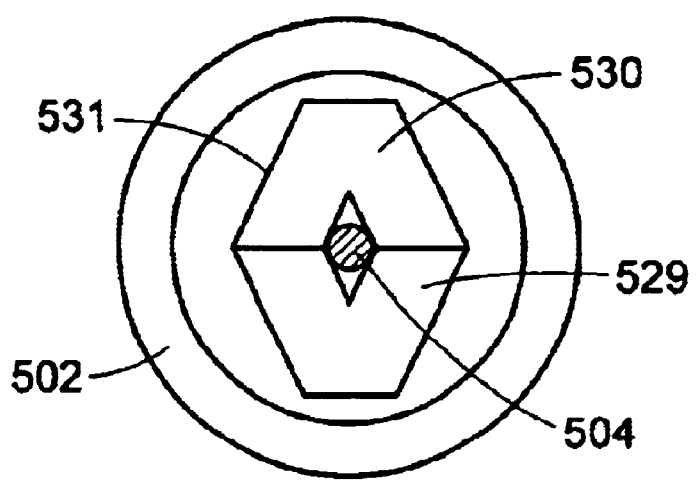
Figure 6:
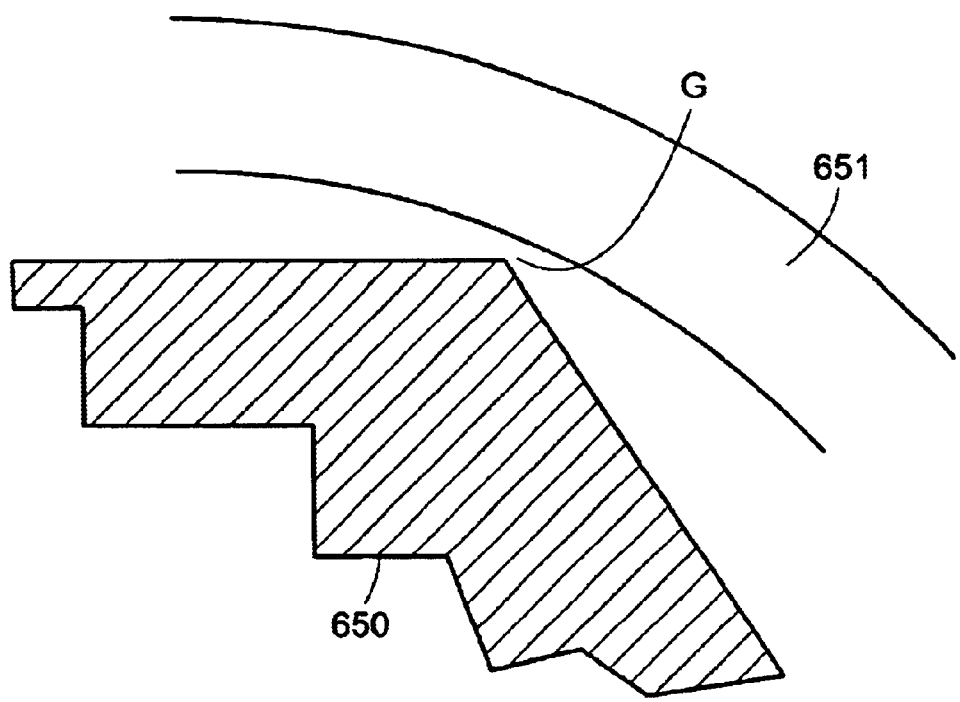
FIG. 6 is a close-up view of a region of the optical waveguide ferrule according to the embodiment of the present invention.

Then, as shown in FIG. 5(e), the waveguide carrier 531 having the optical waveguide 504 is inserted into the carrier tube 502. As mentioned previously, the corners of the waveguide carrier 531 are preferably in contact with or very close to the inside surface of the carrier tube 502. This is shown by the enlarged view of FIG. 6 where reference number 650 denotes the corner region of the waveguide carrier, and reference number 651 denotes the carrier tube. The gap G between the corner region 650 and the inner surface of the carrier tube 651 is preferably less than 10 microns. More preferably, the gap G is less than 5 microns, 4 microns, 2 microns, or 1 microns. Most preferably, the corner is in contact with the inner surface of the carrier tube 651, but this may not be possible for all corners of the waveguide carrier.

Figure 7A:
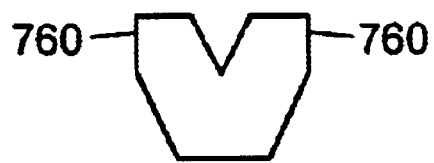
FIGS. 7(a) and 7(b) are cross-sectional views for describing a method of making an optical waveguide ferrule according to another embodiment of the present invention.
Figure 7B:
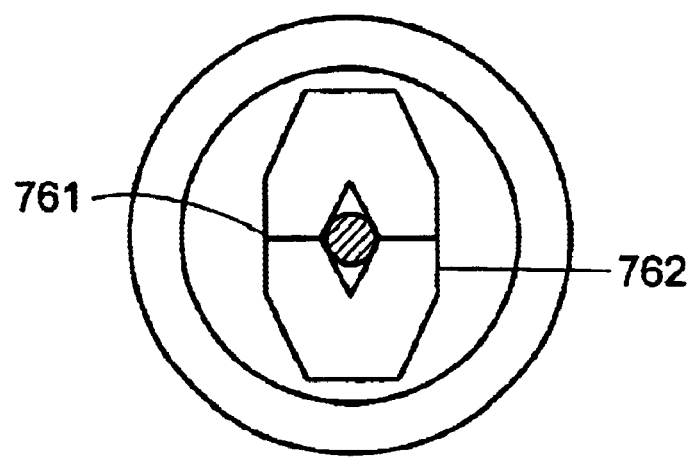

FIGS. 7(a) and 7(b) illustrate another embodiment of the present invention in which a dicing saw is used to separate the wafer into chip pieces after formation of the deep trenches by wet anisotropic etching discussed above in connection with FIG. 5(b). Here, the deep trenches are formed at a depth which does not extend all the way to the opposite surface of the silicon wafer. Rather, the deep trenches are formed only partially through the silicon wafer, and a dicing saw is used to separate the chips from one another. As a result, the chips exhibit vertical dicing saw cut surfaces 760 as shown in FIG. 7(a). The length of these surfaces 760 inversely depends on the depth of the deep trenches. As such, as shown in FIG. 7(b), the resultant waveguide carrier 761 has opposite vertical sidewalls 762, thereby exhibiting an octagonal cross-section.

Figure 2:
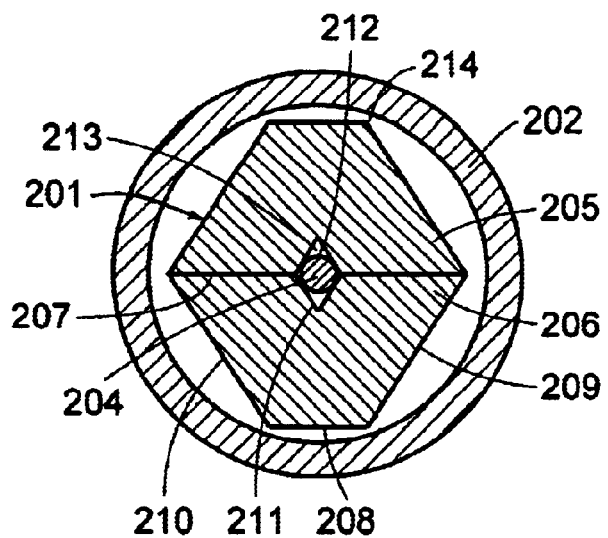
FIG. 2 is a cross-sectional view of an optical waveguide ferrule according to an embodiment of the present invention.
Figure 8:
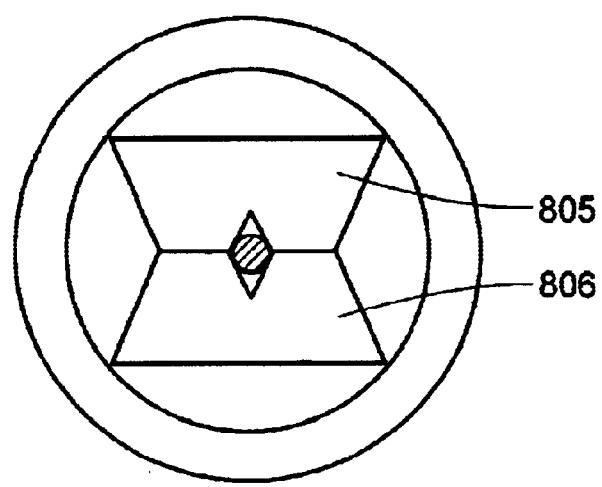
FIG. 8 is a cross-sectional view of an optical waveguide ferrule according to another embodiment of the present invention.

In the embodiment of FIG. 2, the longer of the two parallel surfaces of each of the trapezoidal chips are adhered to one another to form the hexagonal waveguide carrier. FIG. 8 depicts another embodiment of the invention where the shorter of the two parallel surfaces of the chips 805 and 806 contain the opposing grooves and are adhered to one another. In this case, the chips 805 and 806 may be fabricated as shown in FIGS. 9(a) through 9(c).

Figure 9A:
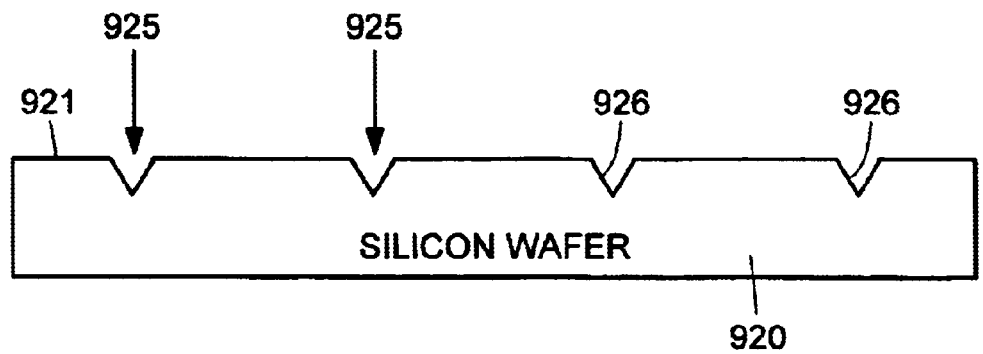
FIGS. 9(a) through 9(c) are cross-sectional views for describing a method of making an optical waveguide ferrule according to another embodiment of the present invention.
Figure 9B:
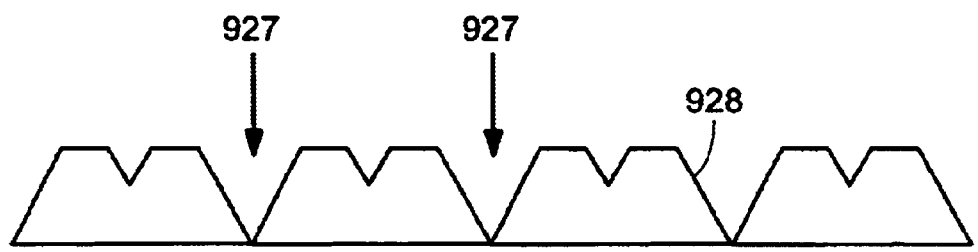
Figure 9C:
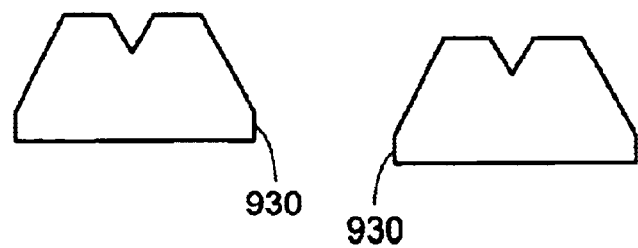

In particular, as shown in FIG. 9(a), a first surface 921 of a silicon wafer 920 is subjected to wet anisotropic etching 925 to form a plurality of elongate and generally V-shaped shallow grooves 926. Then, referring to FIG. 9(b), the same surface 921 of the silicon wafer 920 is subjected to wet anisotropic etching 927 to form a plurality of elongate and generally V-shaped deep trenches 928. As shown, the deep trenches 928 are aligned between the shallow grooves 926 in the surface 921. The silicon wafer 920 is then separated into the individual chips either by continuing the etching of the deep trenches 928 completely through the silicon wafer 920, or by use of a dicing saw. FIG. 9(c) illustrates the latter in which dicing saw surfaces 930 are formed.

Figure 10:
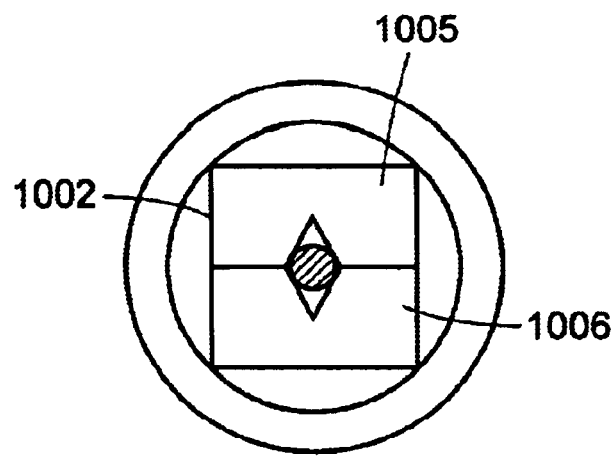
FIGS. 10–12 are cross-sectional views of optical waveguide ferrules according to other embodiments of the present invention.

FIG. 10 illustrates another embodiment of the present invention in which a silicon wafer is separated into the chips 1005 and 1006 by vertical etching or by use of a dicing saw only. In other words, the formation of the deep trenches 528 of FIG. 5(b) or the deep trenches 928 of FIG. 9(b) is omitted from the fabrication process. As such, the resultant waveguide carrier 1002 has a rectangular or square cross-section.

Figure 11:
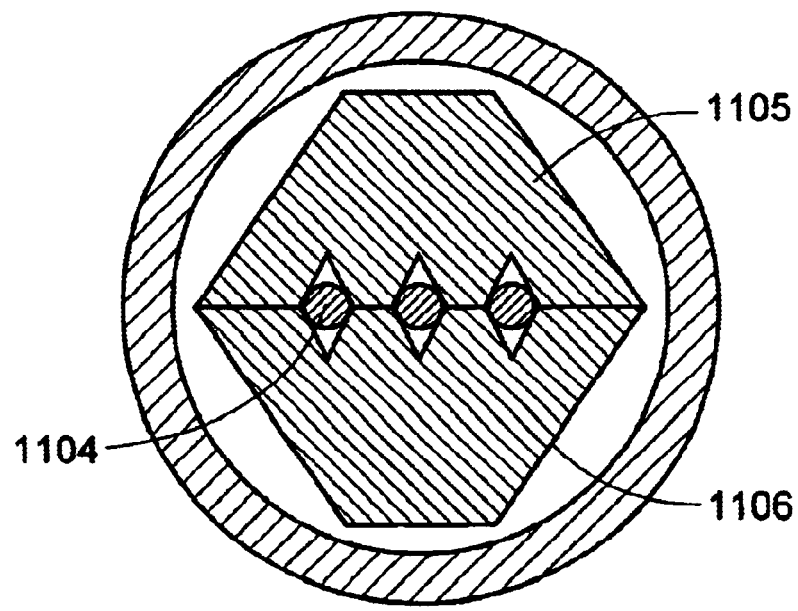
Figure 12:
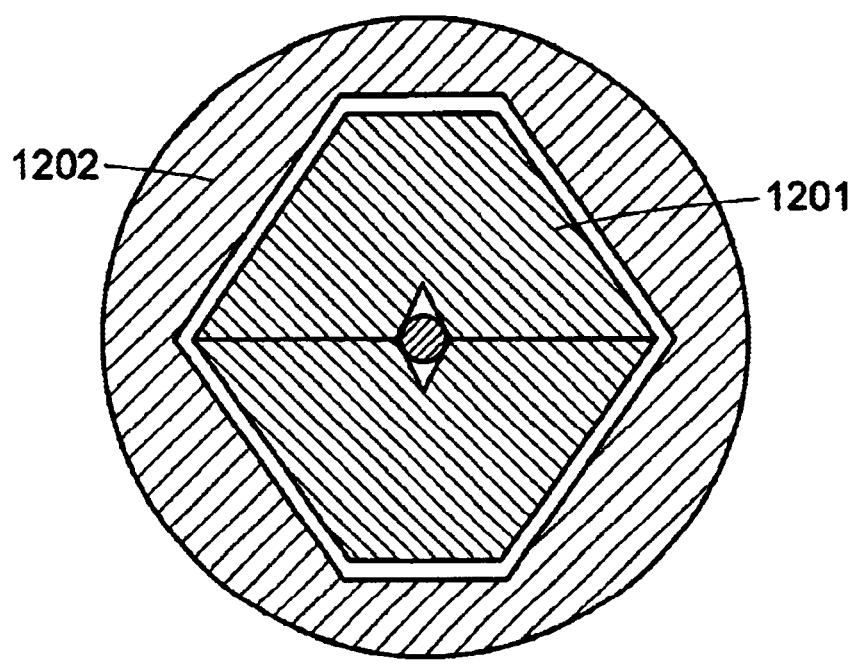

In the embodiments described above, a single optical waveguide is contained within the waveguide carrier. However, as shown in FIG. 11, each of these embodiments can be modified to accommodate plural optical waveguides 1004 by the provision of plural grooves in confronting surfaces of the chips 1105 and 1106. Also, in each of the embodiments described above, the inner periphery of the carrier tube is generally circular. However, other shapes can be adopted in each embodiment, and as shown in the cross-sectional view of FIG. 12, the inner periphery of the carrier tube 1202 can be configured to conform with an outer periphery of the waveguide carrier 1201. Further, each optical waveguide is depicted in the drawings as a single optical fiber. However, the term "optical waveguide" is not so limited, and encompasses, for example, two or more optical fibers contained within a single cavity defined between optionally larger trenches of the opposing waveguide carriers.

As such, while the invention has been described in detail with respect to a number of exemplary embodiments, it is clear that various modifications of the invention will become apparent to those having ordinary skill in art having had benefit of the present disclosure. Such modifications and variations are included in the scope of the appended claims.

What is claimed is:

1. An optical waveguide ferrule comprising:
   a carrier tube having a central axis which extends in a longitudinal direction;
   a waveguide carrier located within the carrier tube; and
   an optical waveguide extending lengthwise in the longitudinal direction within the waveguide carrier;
   wherein the waveguide carrier comprises a first carrier body having a first principal surface and a second carrier body having a second principal surface which confronts the first principal surface,
   wherein the first principal surface has a first groove defined therein which extends lengthwise in the longitudinal direction, and wherein the second principal surface has a second groove defined therein which extends lengthwise in the longitudinal direction, and
   wherein the first and second grooves are aligned with one another to define an elongate cavity which extends lengthwise in the longitudinal direction, and wherein the optical waveguide is contained within the elongate cavity, and
   wherein the first carrier body has a cross-sectional configuration in a plane perpendicular to the longitudinal direction that is defined by at least opposite first and second parallel surfaces and opposite first and second non-parallel inclined surfaces, wherein one of the first or second parallel surfaces is the first principal surface of the first carrier body.

2. An optical ferrule as claimed in claim 1, wherein the first and second carrier bodies are silicon bodies.

3. An optical ferrule as claimed in claim 1, wherein the first and second principal surfaces of the first and second carrier bodies are adhered to one another.

4. An optical ferrule as claimed in claim 1, wherein the optical waveguide is coincident with the central axis of the carrier tube.

5. An optical ferrule as claimed in claim 1, wherein the first and second carrier bodies have a seine cross-sectional configuration in a plane perpendicular to the longitudinal direction.

6. An optical ferrule as claimed in claim 5, wherein the first and second carrier bodies are silicon bodies.

7. An optical ferrule as claimed in claim 5, wherein the waveguide carrier has a hexagonal cross-sectional configuration in the plane perpendicular to the longitudinal direction.

8. An optical ferrule as claimed in claim 5, wherein the waveguide carrier has an octagonal cross-sectional configuration in the plane perpendicular to the longitudinal direction.

9. An optical ferrule as claimed in claim 1, wherein each of the first and second carrier bodies have a trapezoidal cross-sectional configuration in a plane perpendicular to the longitudinal direction.

10. An optical ferrule as claimed in claim 9, wherein the trapezoidal cross-sectional configuration is an isosceles trapezoidal cross-sectional configuration.

11. An optical ferrule as claimed in claim 1, wherein the second carrier body has a cross-sectional configuration in the plane perpendicular to the longitudinal direction that is defined by at least opposite third and fourth parallel surface and opposite third and fourth inclined surfaces, wherein the first parallel surface is longer than the second parallel surface and the third parallel surface is longer than the fourth parallel surface, and wherein the first parallel surface is the first principal surface of the first carrier body and the third parallel surface is the second principal surface of the second carrier body.

12. An optical ferrule as claimed in claim 1, wherein the second carrier body has a cross-sectional configuration in the plane perpendicular to the longitudinal direction that is defined by at least apposite third and fourth parallel surfaces and opposite third and fourth inclined surfaces, wherein the first parallel surface is longer than the second parallel surface and the third parallel surface is longer than the fourth parallel surface, and wherein the second parallel surface is the first principal surface of the first carrier body and the fourth parallel surface is the second principal surface of the second carrier body.

13. An optical waveguide ferrule as claimed in claim 1, wherein a cross-sectional configuration in a plane perpendicular to the longitudinal direction of an inner periphery of the carrier tube conforms with a cross-sectional configuration in the plane perpendicular to the longitudinal direction of an outer periphery of the waveguide carrier.

14. An optical waveguide ferrule comprising:
   a carrier tube having a central axis which extends in a longitudinal direction
   a waveguide carrier located within the carrier tube; and
   a plurality of optical waveguides extending lengthwise in the longitudinal direction within the waveguide carrier;
   wherein the waveguide carrier comprises a first carrier body having a first principal surface and a second carrier body having a second principal surface which confronts the first principal surface,
   wherein the first principal surface has a plurality of first grooves defined therein which extend lengthwise in the longitudinal direction, and wherein the second principal surface has a plurality of second grooves defined therein which extend lengthwise in the longitudinal direction,
   wherein the plurality of first grooves are aligned with the plurality of second grooves to define a plurality of elongate cavities which extend lengthwise in the longitudinal direction, and
   wherein the plurality of optical waveguides are contained within the plurality of elongate cavities, respectively, and
   wherein the first carrier body has a cross-sectional configuration in a plane perpendicular to the longitudinal direction that is defined by at least apposite first and second parallel surfaces and opposite first and second non-parallel inclined surfaces, wherein one of the first or second parallel surfaces is the first principal surface of the first carrier body.

15. An optical ferrule as claimed in claim 14, wherein the first and second carrier bodies are silicon bodies.

16. An optical ferrule as claimed in claim 14, wherein the first and second principal surfaces of the first and second carrier bodies are adhered to one another.

17. An optical ferrule as claimed in claim 14, wherein one of the plurality of optical waveguides is coincident with the central axis of the carrier tube.

18. An optical ferrule as claimed in claim 14, wherein the first and second carrier bodies have a same cross-sectional configuration in a plane perpendicular to the longitudinal direction.

19. An optical ferrule as claimed in claim 18, wherein the first and second carrier bodies are silicon bodies.

20. An optical ferrule as claimed in claim 18, wherein the waveguide earner has a hexagonal cross-sectional configuration in the plane perpendicular to the longitudinal direction.

21. An optical ferrule as claimed in claim 18, wherein the waveguide carrier has an octagonal cross-sectional configuration in the plane perpendicular to the longitudinal direction.

22. An optical ferrule as claimed in claim 14, wherein each of the first and second carrier bodies have a trapezoidal cross-sectional configuration in a plane perpendicular to the longitudinal direction.

23. An optical ferrule as claimed in claim 22, wherein the trapezoidal cross-sectional configuration is an isosceles trapezoidal cross-sectional configuration.

24. An optical ferrule as claimed in claim 14, wherein the second carrier body has a cross-sectional configuration in the plane perpendicular to the longitudinal direction that is defined by at least opposite third and fourth parallel surfaces and opposite third and fourth inclined surfaces, wherein the first parallel surface is longer than the second parallel surface and the third parallel surface is longer than the fourth parallel surface, and wherein the first parallel surface is the first principal surface of the first carrier body and the third parallel surface is the second principal surface of the second carrier body.

25. An optical ferrule as claimed in claim 14, wherein the second carrier body has a cross-sectional configuration in the plane perpendicular to the longitudinal direction that is defined by at least opposite third and fourth parallel surfaces and opposite third and fourth inclined surfaces, wherein the first parallel surface is longer than the second parallel surface and the third parallel surface is longer than the fourth parallel surface, and wherein the second parallel surface is the first principal surface of the first carrier body and the fourth parallel surface is the second principal surface of the second carrier body.

26. An optical ferrule as claimed in claim 14, wherein a cross-sectional configuration in a plane perpendicular to the longitudinal direction of an inner periphery of the carrier tube conforms with a cross-sectional configuration in the plane perpendicular to the longitudinal direction of an outer periphery of the waveguide carrier.

27. A method of making an optical waveguide ferrule, comprising:
   etching a silicon wafer to form a plurality of grooves which extend parallel to one another in a first surface of the silicon wafer;
   etching the silicon wafer to form a plurality of trenches in a second surface of the silicon wafer which is opposite the first surface, wherein the trenches are formed so as to extend parallel to one another between respectively adjacent pairs of the parallel grooves and in a same direction as the parallel grooves;
   separating the silicon wafer into discrete chips at respective bottoms of the trenches such that the first surface of each of the discrete chips comprises at least one of the grooves;
   placing an optical waveguide in a groove of a first one of the discrete chips;
   placing the first surface of a second one of the discrete chips against the first surface of the first one of the discrete chips such that the groove of the first one of the discrete chips is aligned with a groove of the second one of the discrete chips, wherein the optical waveguide is enclosed between the respective grooves of the first and second discrete chips.

28. The method as claimed in claim 27, wherein the silicon wafer is separated into the discrete chips by the etching of the trenches to a depth which reaches the first surface of the silicon wafer.

29. The method as claimed in claim 27, wherein the silicon wafer is separated into the discrete chips by a dicing saw.

30. A method of making an optical waveguide ferrule, comprising:

etching a silicon wafer to form a plurality of grooves which extend parallel to one another in a first surface of the silicon wafer;

etching the silicon wafer to form a plurality of trenches in the first surface of the silicon wafer, wherein the trenches are formed so as to extend parallel to one another between respectively adjacent pairs of the parallel grooves and in a same direction as the parallel grooves;

separating the silicon wafer into discrete chips at respective bottoms of the trenches such that the first surface of each of the discrete chips comprises at least one of the grooves;

placing an optical waveguide in a groove of a first one of the discrete chips;

placing the first surface of a second one of the discrete chips against the first surface of the first one of the discrete chips such that the groove of the first one of the discrete chips is aligned with a groove of the second one of the discrete chips, wherein the optical waveguide is enclosed between the respective grooves of the first and second discrete chips.

31. The method as claimed in claim 30, wherein the silicon wafer is separated into the discrete chips by the etching of the trenches to a depth which reaches a surface of the silicon wafer which is apposite the first surface.

32. The method as claimed in claim 30, wherein the silicon wafer is separated into the discrete chips by a dicing saw.

33. An optical waveguide ferrule comprising:

a carrier tube having a central axis which extends in a longitudinal direction;

a waveguide carrier located within the carrier tube; and an optical waveguide extending lengthwise in the longitudinal direction within the waveguide carrier;

wherein the waveguide carrier comprises a first silicon carrier body having a first principal surface and a second silicon carrier body having a second principal surface which confronts the first principal surface, wherein the first principal surface has a groove therein which extends lengthwise in the longitudinal direction, the optical waveguide being disposed in the groove, and wherein the first carrier body has a cross-sectional configuration in a plane perpendicular to the longitudinal direction that is defined by at least opposite first and second parallel surfaces and opposite first and second non-parallel inclined surfaces wherein one of the first or second parallel surfaces is the first principal surface of the first carrier body.

34. An optical ferrule as claimed in claim 33, wherein the first and second carrier bodies have a same cross-sectional configuration in a plane perpendicular to the longitudinal direction.

35. An optical ferrule as claimed in claim 33, wherein the waveguide carrier has a hexagonal or octagonal cross-sectional configuration in the plane perpendicular to the longitudinal direction.

36. An optical ferrule us claimed in claim 33, wherein each of the first and second carrier bodies have a trapezoidal cross-sectional configuration in a plane perpendicular to the longitudinal direction.

37. A method of making an optical waveguide ferrule, comprising:

etching a silicon wafer to form a plurality of grooves which extend parallel to one another in a first surface of the silicon wafer;

etching the silicon wafer to form a plurality of trenches in a second surface of the silicon wafer which is opposite the first surface, wherein the trenches are formed so us to extend parallel to one another between respectively adjacent pairs of the parallel grooves and in a same direction as the parallel grooves;

separating the silicon wafer into discrete chips at respective bottoms of the trenches such that the first surface of each of the discrete chips comprises at least one of the grooves;

placing an optical waveguide in a groove of one of the discrete chips;

placing a second chip against the first surface of the discrete chip such that the optical waveguide is enclosed between the groove of the first chip and the second chip.

38. The method as claimed in claim 37, wherein the silicon wafer is separated into the discrete chips by the etching of the trenches to a depth which reaches the first surface of the silicon wafer.

39. The method as claimed in claim 37, wherein the silicon wafer is separated into the discrete chips by a dicing saw.

* * * * *